Oct. 1, 1929.   W. K. LEWIS   1,730,152
ART OF OBTAINING GASOLINE HYDROCARBONS
Filed Feb. 3, 1923
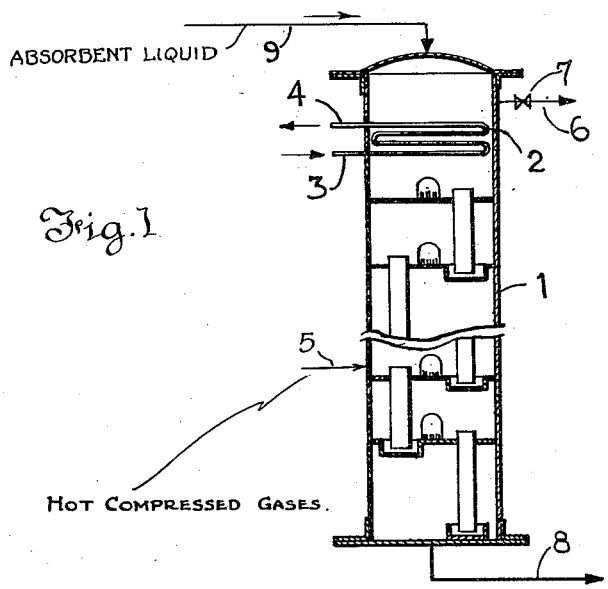
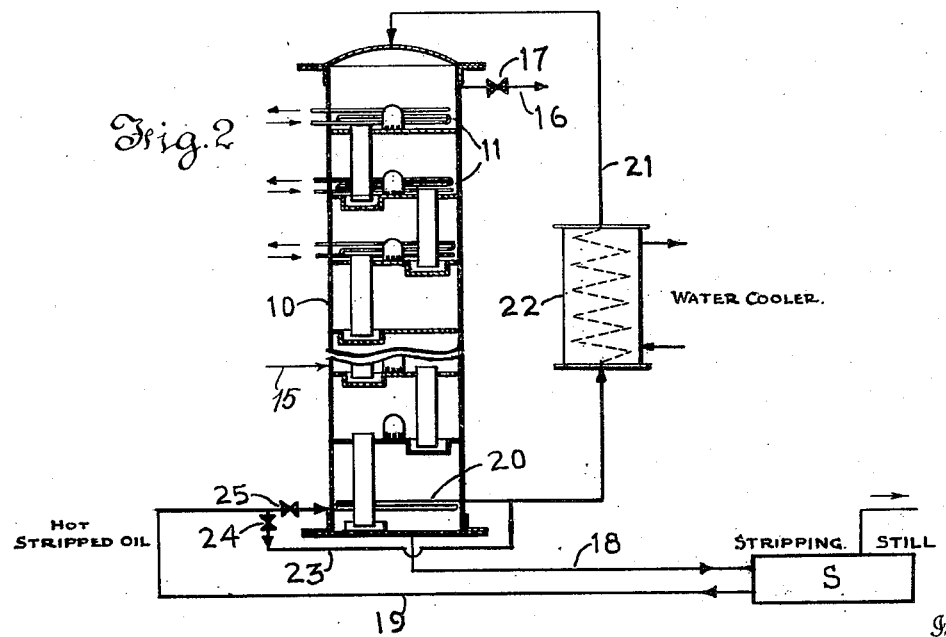

Patented Oct. 1, 1929

1,730,152

UNITED STATES PATENT OFFICE

WARREN K. LEWIS, OF NEWTON, MASSACHUSETTS, ASSIGNOR TO STANDARD OIL DEVELOPMENT COMPANY, A CORPORATION OF DELAWARE

ART OF OBTAINING GASOLINE HYDROCARBONS

Application filed February 3, 1923. Serial No. 616,777.

This invention relates to the art of recovering condensible constituents from hydrocarbon gases, and will be fully understood from the following description, taken in connection with the accompanying drawing in which—

Fig. 1 represents semi-diagrammatically a vertical section of one form of apparatus contemplated in the invention; and Fig. 2 is a similar view of a modification; both figures being broken for accommodation to the limits of the drawing.

In Fig. 1 of the drawing the reference character 1 designates a cooling apparatus affording contact between gas and accumulated liquid, for example a tower of the type containing a series of plates with bell-caps and overflows. Arranged in the upper end of the tower is a suitable cooling means, as a coil 2 having an inlet and outlet 3, 4 for a cooling fluid. A gas inlet pipe 5 connects into the bottom or lower portion of the tower, and a gas outlet 6 with a controlling valve 7 is provided at the top.

A gas carrying constituents to be recovered, for example casing head gas or other natural gas or tail gas from stills, is introduced hot and under pressure, into the tower, by the inlet 5. Cooling is effected in a gradually progressive manner as the gas proceeds, the constituents which condense along in the tower flowing down in intimate contact with the rising gas and themselves effecting a graduated cooling action upon it, also certain lighter constituents re-vaporizing progressively abstract heat, and so the gas is progressively cooled to the top of the tower. In this manner a high efficiency is realized in the cooling and in the obtaining of just the constituents desired. Pressure is maintained in the tower; for example in making natural gas gasoline a tower pressure of 75–200 lbs. is ordinarily suitable but this may be varied with the gas used. The condensate reaching the bottom of the tower is taken off by pipe 8, and the stripped gas leaves the system through the pressure controlling valve 7.

Where desired, operations may be carried on in the presence of an absorbent liquid, this being introduced into the top of the tower as at 9, so as to distribute and flow down countercurrent to the gas. In using naphtha for instance as the liquid, the desired constituents separated from the gas are carried with the naphtha absorbent, which is drawn off at the bottom of the tower through pipe 8. In accordance as lighter or heavier naphtha is used and the amount fed is proportioned, lighter or heavier casinghead stock may be made, or even a finished gasoline may be prepared.

When using an absorbent having boiling points above the gasoline range, as for instance, mineral seal oil which is miscible with the condensed constitutents of the gas and is substantially non-volatile under the conditions imposed, such oil may be run down through the tower and through a stripping still to remove the constituents picked up from the gas. For such usage the apparatus shown in Fig. 2 is advantageous. The tower 10 of suitable construction, for example as of the type already mentioned is provided with a gas inlet pipe 15 at the lower portion of the tower, and a gas outlet 16 with a pressure controlling valve 17 is provided at the top.

A pipe 18 leads to a stripping still S of any usual or preferred construction, and a pipe 19 returns the stripped oil through a coil 20 and pipe 21 to discharge into the top of the tower. A cooling box 22 is interposed to insure adequate reduction in temperature before the oil enters the tower. The gas to be treated, enters by pipe 15 and flows up countercurrently to the absorber liquid, which having been suitably cooled, flows down to cool the rising gas, and additionally, as in the first case, condensates forming flow down and also effect a graduated temperature exchange with the gas, with a total result of progressively cooling the gas and absorbing the desired constituents. In distinction to prior methods of rectification in the absence of absorption liquid, I have designated the novel method described herein as "absorptive rectification."

The stripped gas leaves the system at vlave 17, and the absorber oil with retained constituents flows out by pipe 18 to the stripping still where the gasoline constituents are taken off and the hot stripped absorber oil is returned through the pipe 19, and coil 20. A by-pass 23 with controlling valve 24 is provided and the quantity of hot oil to the coil 20 is regulated as desired by the valves 24 and 25 to secure proper vaporization in the tower; and the cooling box 22 conditions the temperature of the oil for its entrance into the top of the tower. Where desired, cooling coils 11 having inlets and outlets for cooling fluid may be provided in the upper part of the tower.

While I have described the invention with reference to certain specific details, changes may be made, within the spirit and scope of the invention, and the invention is to be regarded as limited only as defined in the following claims, in which it is my intention to claim all inherent novelty as broadly as the prior art permits.

What I claim is:

1. The improvement in the art of recovering gasoline from gas, comprising absorbing gasoline constituents in an oil miscible therewith and substantially non-volatile under the conditions imposed, rectifying in the presence of said absorption oil to produce therein a gasoline product substantially free from highly volatile components, and separating such product from the absorption oil.

2. The improvement in the art of recovering condensible hydrocarbons, comprising passing the hydrocarbons upward through a gas and liquid contact zone, flowing down through such zone an absorption liquid substantially non-volatile under the conditions imposed and miscible with the hydrocarbons, and rectifying the hydrocarbons in the presence of such absorption liquid to obtain a normally liquid product substantially free from highly volatile components.

3. The improvement in the art of recovering condensible hydrocarbons from a gas containing the same, comprising introducing the gas at an intermediate point of a gas and liquid contact zone, introducing into such zone, above the gas inlet thereinto, an absorption liquid substantially non-volatile under the conditions imposed and miscible with the condensible hydrocarbons, the point of introduction of said liquid being at least in part adjacent the top of the gas and liquid contact zone, causing intimate countercurrent contact of said gas and liquid, and heating the zone near its bottom and cooling it near its top.

4. The improvement in the art of recovering condensible hydrocarbons from a gas containing the same, comprising passing the gas upward through a gas-and-liquid contact zone, flowing down through such zone an absorption liquid substantially non-volatile under the conditions imposed and miscible with the condensible hydrocarbons, and rectifying constituents of the gas in the presence of such absorption oil to obtain a normally liquid product substantially free from highly volatile components.

WARREN K. LEWIS.